UNITED STATES PATENT OFFICE.

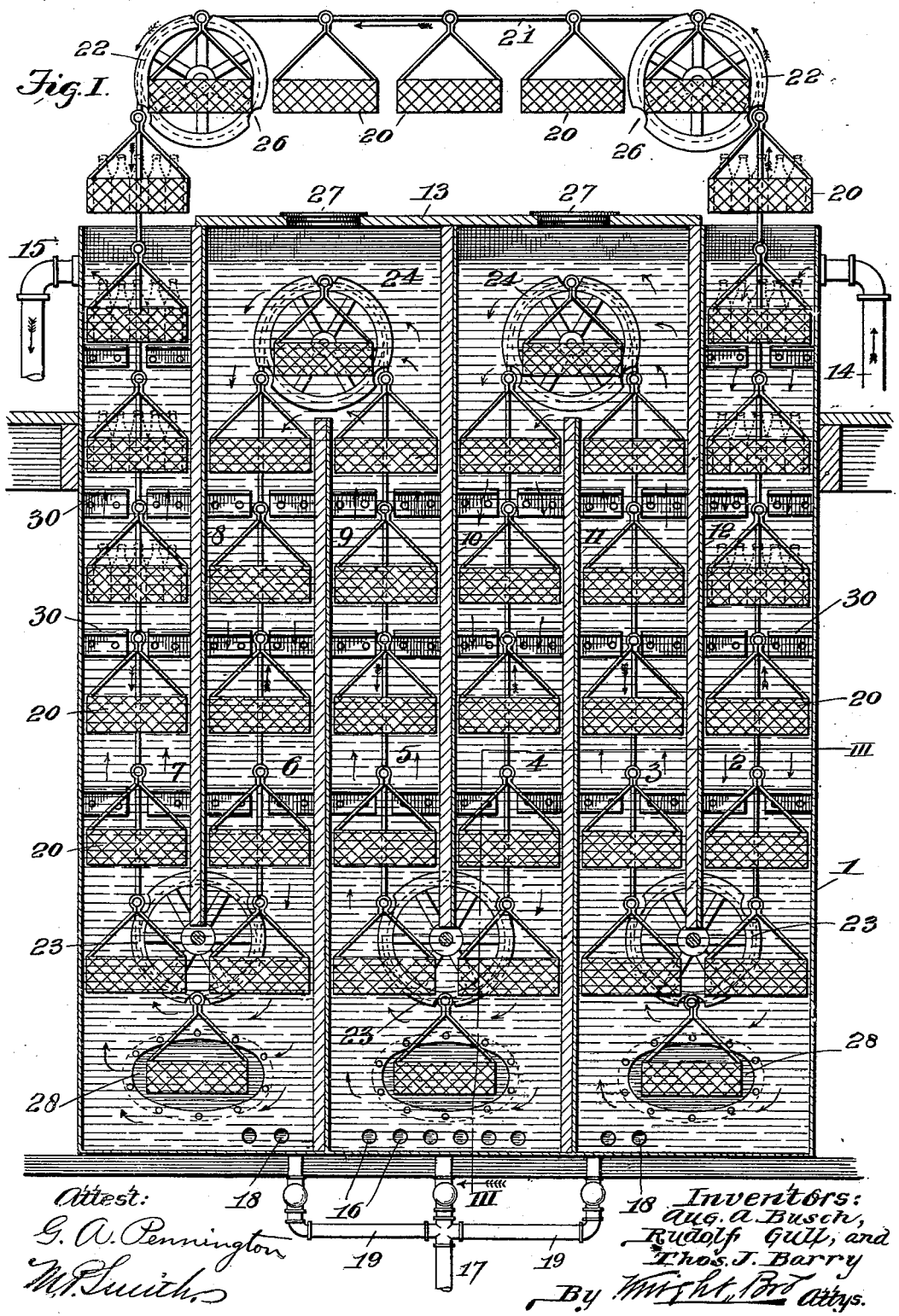

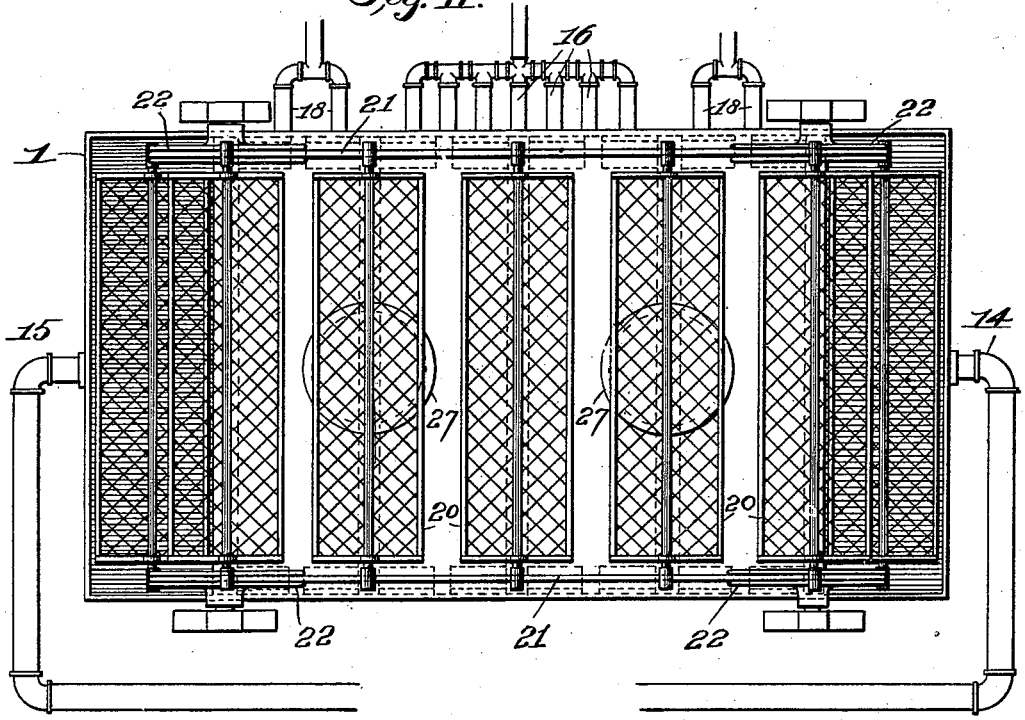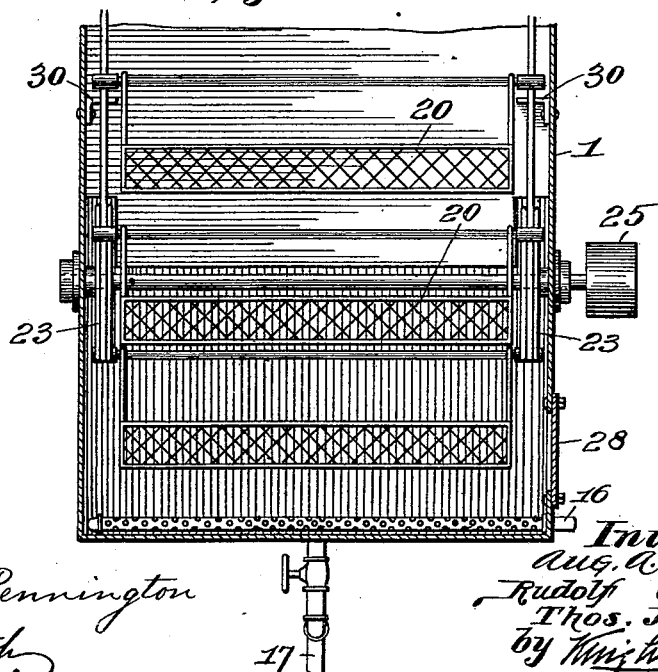

AUGUST A. BUSCH, RUDOLF GULL, AND THOMAS J. BARRY, OF ST. LOUIS, MISSOURI.

PASTEURIZER.

SPECIFICATION forming part of Letters Patent No. 713,952, dated November 18, 1902.

Application filed June 22, 1901. Serial No. 65,627. (No model.)

*To all whom it may concern:*

Be it known that we, AUGUST A. BUSCH, a citizen of the United States, RUDOLF GULL, a citizen of Switzerland, and THOMAS J. BARRY, a citizen of the United States, all residing in the city of St. Louis, in the State of Missouri, have invented certain new and useful Improvements in Pasteurizers, of which the following is a full, clear, and exact description, reference being had to the accompanying drawings, forming part of this specification.

Our invention relates to an apparatus particularly intended for pasteurizing beer, but which may be used for sterilizing milk and other substances.

The object of the invention is to produce a pasteurizer or sterilizer in which there is a gradual heating of the substance being sterilized to the maximum temperature and then a gradual cooling of the substance to about atmospheric temperature, so that while undergoing sterilization the substance is not subjected to deleterious effects, and to further accomplish this result the vessels containing the substance to be sterilized are retained in the bath from the beginning to the end of the operation.

With these objects in view our invention consists in features of novelty hereinafter fully described, and pointed out in the claims.

Figure I is a vertical section of our improved pasteurizer. Fig. II is a top or plan view. Fig. III is a detail vertical section taken on line III III, Fig. I, and looking in the direction of the arrow that crosses the section-line.

Referring to the drawings, 1 represents a closed casing or housing interiorly divided into compartments 2, 3, 4, 5, 6, and 7 by means of vertical partitions 8, 9, 10, 11, and 12, the compartments forming a continuous conduit through which the heating water or liquid is passed in one direction and the substance to be sterilized is passed in the opposite direction. The partitions 8, 10, and 12 extend downwardly from the top 13 of the casing and the partitions 9 and 11 extend upwardly from the bottom of the casing. The top 13 of the casing covers the compartments 3, 4, 5, and 6, so that the heat in these compartments is largely retained, while the compartments 2 and 7 are left open at top to permit the passage of the bottle-carrying receptacles.

14 represents a water-supply pipe leading into the upper part of compartment 2, and 15 represents a water-discharge pipe leading out of the upper part of compartment 7. Located in the lower part of the compartments 4 and 5 is a heating-coil 16, (a perforated pipe being preferably used,) that receives hot air or steam from a pipe 17, and if desirable a heating-coil 18 may be located in the bottom of compartments 3 and 6, which would receive the heating fluid from branches 19 of the pipe 17.

20 represents baskets or receptacles for receiving the substance to be sterilized, this substance being contained in bottles or other closed vessels. The baskets are connected to endless cables 21, that pass over sheaves 22, located above the casing, under sheaves 23, located in the lower part of the compartments, as seen in Fig. I, and over sheaves 24, located in the upper part of the compartments. These sheaves are secured to shafts suitably journaled in the casing, one or more of the shafts being provided with a driving-pulley 25. The sheaves are grooved and their flanges are provided with notches 26 to receive the rods that connect the baskets to the cables.

The top 13 of the casing is provided with manholes 27, through which access may be had to the upper part of the interior of the casing, and the lower part of the casing is provided with manholes 28 to provide access to the interior of the lower part of the casing.

The operation is as follows: The water passes into the casing from the pipe 14 and out of the casing through the pipe 15, a circulation being maintained through the conduit formed by the various compartments, the passage of the water being in the direction indicated by the featherless arrows. When the water in the compartments 4 and 5 has become sufficiently heated for sterilizing purposes—say to about 145° Fahrenheit—the basket-carrying cables are set in motion, moving the baskets in the direction of the feathered arrows, the material being sterilized thus being moved in the opposite direction to the circulation of the water, so that the cold bottles are upon entering the casing brought into contact with the warm water leaving the apparatus, while the hot bottles are brought into contact with the cold water entering the apparatus, the result being that the substance in the bottles is gradually heated after first entering the apparatus until the maximum temperature is reached in the bottom of the compartments 5 and 4, and then the bottles are gradually cooled off until they pass out of the compartment 2, at which time the substance is about the temperature of the atmosphere. As there is a constant circulation of water through the baskets, (which are made of wire-netting or other open-work,) a thorough heating and cooling of the bottles is effected, thus producing perfect sterilization or pasteurization, and as the vessels do not leave the bath after they once enter until they are cooled down to about atmospheric temperature there is no danger of the bottles being broken by being subjected to sudden changes of temperature, and at the same time deleterious effects by the sudden changes of temperature on the contents of the bottles are prevented.

To insure a perfect circulation of water through the baskets and to prevent a stronger flow of water up the sides of the conduit through the spaces left at the ends of the baskets to accommodate the sheaves 23 and 24, we secure L-shaped brackets 30 to the inside of the casing, as shown in the drawings, these brackets acting to deflect the water into the path traveled by the baskets should there be a tendency for a stronger current of water at the ends of the baskets than through the baskets.

We claim as our invention—

1. In a pasteurizer, the combination of a closed casing having inlet and outlet openings, said casing divided into compartments formed in interior conduit, means for moving the substance to be sterilized through said inlet, the conduit and said outlet in one direction, means for causing a circulation of water through the conduit in the opposite direction to that in which the substance is moving, and means for heating the water in the central part of the conduit, substantially as set forth.

2. In a pasteurizer, the combination of a closed casing having inlet and outlet openings, said casing divided into vertical compartments forming a conduit, means for causing a circulation of water through the conduit in one direction, means for moving the substance to be sterilized through said inlet, the conduit and said outlet, in the opposite direction to that in which the water moves, and means for heating the water in the central part of the conduit; the substance being sterilized entering the conduit at the end thereof at which the water is discharged, substantially as set forth.

3. In a pasteurizer, the combination of a casing having inlet and outlet openings, said casing divided interiorly into a conduit by partitions projecting downwardly from above the water-line, but not extending to the bottom of the casing and upwardly-projecting partitions that do not extend to the top of the casing, means for causing a circulation of water through the conduit in one direction, means for moving the substance to be sterilized through said inlet, the conduit and said outlet in the opposite direction to that in which the water moves, and means for heating the water in the central part of the conduit.

4. In a pasteurizer, a casing divided interiorly into a conduit by partitions extending downwardly from the top thereof, but not extending to the bottom of the casing, and upwardly-extending partitions that do not extend to the top of the casing and which terminate beneath the water-line, means for heating the water in the central part of the conduit, means causing a circulation of water through said conduit in one direction, and a carrier for moving the substance to be sterilized through the conduit in the opposite direction without removing the substance to be sterilized from the water-bath from the time it enters the machine until it leaves the machine.

5. In a pasteurizer, the combination with a water-casing divided interiorly into an attemperating compartment, a sterilizing compartment, and a cooling compartment, of means for heating the water in the sterilizing compartment, means causing a circulation of water through said compartments in one direction, and means conveying the substance to be sterilized through each of said compartments in the opposite direction, without removing the same from the water-bath, from the time it enters the casing until the time it leaves the casing.

6. In a pasteurizer, the combination of a casing having inlet and outlet openings, said casing having interior vertical partitions forming a conduit, means for causing a circulation of water through the conduit in one direction, means for moving the substance to be sterilized through said inlet, the conduit and said outlet in the opposite direction to that in which the water moves, and means for heating the water in the central part of the conduit; the central portion of the conduit being closed at top and the ends of the conduit being left open for the passage of the receptacles, substantially as set forth.

7. In a pasteurizer, the combination of a closed casing having inlet and outlet openings, said casing having an interior conduit, means for creating a circulation of water through the conduit in one direction, means for heating the water in the central part of the conduit and means for carrying the substance to be sterilized through said inlet, the conduit and said outlet in the opposite direction to that in which the water moves; said last-mentioned means consisting of cables passing over sheaves and bottle-receiving receptacles pivotally connected to the cables, substantially as set forth.

8. In a pasteurizer, the combination of a closed casing having inlet and outlet openings, said casing having an interior conduit, means for causing a circulation of water through the conduit in one direction, bottle-carrying baskets arranged to move through said inlet, the conduit and said outlet in the opposite direction to that traveled by the water, means for heating the water in the central part of the conduit, and brackets 30 secured to the inside of the casing, substantially as set forth.

9. In a pasteurizer, the combination of a casing having inlet and outlet openings, said casing having an interior conduit, means for causing a circulation of water through the conduit in one direction, bottle-carrying baskets arranged to move through said inlet, the conduit and said outlet in the opposite direction to that traveled by the water, deflectors on the walls of said conduit insuring a perfect circulation of water through said baskets, and means for heating the water in the central part of the conduit.

10. In a pasteurizer, the combination of a casing having inlet and outlet openings, said casing divided into compartments formed in interior conduit, sheaves located above said casing and sheaves located within said casing, endless cables carried by said sheaves, baskets for conveying the substance to be sterilized, said baskets carried and adapted to be moved by said cables through said inlet, the conduit and said outlet in one direction, and means for causing a circulation of water through said conduit in an opposite direction, said means comprising a water-supply pipe near said outlet-opening and a waste-pipe near said inlet-opening, of deflectors on the walls of said conduit insuring a perfect circulation of water through said baskets, and heating-coils located in the bottom of said compartments whereby the water may be heated to different degrees of temperature in different parts of the conduit.

11. In a pasteurizer, a suitable casing, means for causing a circulation of water through said casing in one direction, means for moving the substance to be sterilized through said casing in the opposite direction, and means for heating said water in the central part of said casing.

AUG. A. BUSCH.
RUDOLF GULL.
THOMAS J. BARRY.

In presence of—
E. S. KNIGHT,
M. P. SMITH.